US012759530B2

(12) United States Patent
Nagaoka et al.

(10) Patent No.: US 12,759,530 B2
(45) Date of Patent: Oct. 13, 2026

(54) TRAVEL CONTROL DEVICE

(71) Applicant: HONDA MOTOR CO., LTD., Tokyo (JP)

(72) Inventors: Nobuharu Nagaoka, Tokyo (JP); Kento Yamakawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/191,654

(22) Filed: Apr. 28, 2025

(65) Prior Publication Data

US 2026/0061985 A1 Mar. 5, 2026

(30) Foreign Application Priority Data

Sep. 4, 2024 (JP) ................................. 2024-152690

(51) Int. Cl.

*B60W 10/22* (2006.01)
*B60W 10/18* (2012.01)
*B60W 30/14* (2006.01)
*B60W 50/14* (2020.01)
*G06V 20/56* (2022.01)

(52) U.S. Cl.

CPC ............ *B60W 10/22* (2013.01); *B60W 10/18* (2013.01); *B60W 30/146* (2013.01); *B60W 50/14* (2013.01); *G06V 20/588* (2022.01); *B60W 2420/403* (2013.01); *B60W 2520/10* (2013.01); *B60W 2552/35* (2020.02)

(58) Field of Classification Search

CPC .... B60W 10/22; B60W 10/18; B60W 30/146; B60W 50/14; G06V 20/588

See application file for complete search history.

(56) References Cited

U.S. PATENT DOCUMENTS

| | | | | |
|---|---|---|---|---|
| 2020/0290624 | A1* | 9/2020 | Kumano | B60W 60/0011 |
| 2021/0053409 | A1* | 2/2021 | Kim | B60G 17/06 |

FOREIGN PATENT DOCUMENTS

| | | | |
|---|---|---|---|
| JP | H03182825 | A | 8/1991 |
| JP | 2001191776 | A | 7/2001 |
| JP | 2003276413 | A | 9/2003 |
| JP | 2010287044 | A | 12/2010 |
| JP | 2012167704 | A | 9/2012 |

(Continued)

OTHER PUBLICATIONS

Notice of Reasons for Refusal for Japanese Patent Application No. 2024-152690 dated Mar. 3, 2026; 7 pp.

*Primary Examiner* — Luke Huynh
(74) *Attorney, Agent, or Firm* — Armstrong Teasdale LLP

(57) ABSTRACT

A travel control device for a vehicle includes a vehicle speed detector that detects a vehicle speed of the vehicle, a recessed portion detector that detects a position and a length of a recessed portion present on a road surface in front of the vehicle, a suspension controller that controls suspension devices provided between a vehicle body and wheels and can change a distance between the vehicle body and the wheels in an up-and-down direction, and a determiner that determines whether the wheel can pass over the recessed portion based on the vehicle speed and the length of the recessed portion. In a case where the determiner determines that the wheel can pass over the recessed portion, the suspension controller retracts the suspension device corresponding to the wheel when the wheel reaches an edge of the recessed portion.

5 Claims, 9 Drawing Sheets

(56) References Cited

FOREIGN PATENT DOCUMENTS

| | | | |
|---|---|---|---|
| JP | 2022114191 | A | 8/2022 |
| JP | 2023120935 | A | 8/2023 |
| JP | 2023150074 | A | 10/2023 |
| KR | 20180071776 | A | 6/2018 |

* cited by examiner

Fig.6A

| vehicle speed (km/h) | target retraction amount (cm) |
|---|---|
| 60 | 0.4 |
| 70 | 0.3 |
| 80 | 0.2 |
| 90 | 0.2 |
| 100 | 0.2 |
| 110 | 0.1 |
| 120 | 0.1 |
| 130 | 0.1 |

length of recessed portion=0.5m

Fig.6B

| vehicle speed (km/h) | target retraction amount (cm) |
|---|---|
| 60 | 1.8 |
| 70 | 1.3 |
| 80 | 1.0 |
| 90 | 0.8 |
| 100 | 0.6 |
| 110 | 0.5 |
| 120 | 0.4 |
| 130 | 0.4 |

length of recessed portion=1.0m

TRAVEL CONTROL DEVICE

TECHNICAL FIELD

The present invention relates to a travel control device of a vehicle.

BACKGROUND ART

In recent years, active efforts have been made to provide sustainable transportation systems that take into account people in vulnerable situations among traffic participants. To achieve this, research and development on autonomous driving technology to further improve safety and convenience of traffic is being carried out.

For example, JP2023-120935A discloses a travel control device of a vehicle that sets a travel route suitable for rough roads. The travel control device recognizes a height distribution of a road surface in front of the vehicle and generates the travel route so that a wheel passes through a position where a change rate of the road surface height along the vehicle's traveling direction is small. JP2022-114191A discloses a travel control device of a vehicle that sets a travel route taking puddles on a road surface into account.

However, in the travel control devices of JP2023-120935A and JP2022-114191A, since the travel route is changed to avoid obstacles such as bumps and puddles, the occupant of the vehicle may feel uncomfortable with the behavior of the vehicle.

SUMMARY OF THE INVENTION

In view of the above background, an object of the present invention is to provide a vehicle control device that can avoid a recessed portion while suppressing a discomfort caused to an occupant, and thereby contributes to the development of sustainable transportation systems.

To achieve such an object, one aspect of the present invention provides a travel control device for a vehicle (2) including: a vehicle speed detector (61) that detects a vehicle speed of the vehicle; a recessed portion detector (62) that detects a position and a length of a recessed portion (101) present on a road surface (100) in front of the vehicle; a suspension controller (63) that controls a plurality of suspension devices (4) that is provided between a vehicle body (3) and a plurality of wheels (4) and can change a distance between the vehicle body and one of the wheels in an up-and-down direction; and a determiner (64) that determines whether the one of the wheels can pass over the recessed portion based on the vehicle speed and the length of the recessed portion, and in a case where the determiner determines that the one of the wheels can pass over the recessed portion, the suspension controller retracts one of the suspension devices corresponding to the one of the wheels when the one of the wheels reaches an edge (112) of the recessed portion.

According to this aspect, when the one of the wheels reaches the recessed portion, the wheel is pulled toward the vehicle body, i.e., pulled upward. This allows the wheel to pass over the recessed portion without entering the recessed portion. Accordingly, the vehicle can move straight without being affected by the recessed portion. In this way, it is possible to provide a vehicle control device that can avoid the recessed portion while suppressing the discomfort caused to the occupant.

In the above aspect, preferably, the suspension controller determines a retraction amount of the one of the suspension devices based on the vehicle speed and the length of the recessed portion.

According to this aspect, the wheel can reliably pass over the recessed portion. Further, the impact when the wheel contacts the road surface after passing over the recessed portion can be reduced.

In the above aspect, preferably, the suspension controller increases the retraction amount of the one of the suspension devices as the length of the recessed portion increases.

According to this aspect, the wheel can reliably pass over the recessed portion. By increasing the retraction amount of the suspension, the amount of upward movement of the wheel increases. As a result, the time until the wheel and the vehicle body move downward and the wheel contacts the road surface can be extended.

In the above aspect, preferably, the suspension controller increases the retraction amount of the one of the suspension devices as the vehicle speed decreases.

According to this aspect, even when the vehicle speed is low, the wheel can reliably pass over the recessed portion.

In the above aspect, preferably, the travel control device further includes a travel controller (65) that controls a driving device (41) and a brake device (42) of the vehicle, and in a case where the determiner determines that the one of the wheels cannot pass over the recessed portion, the travel controller controls at least one of the driving device and the brake device to decelerate the vehicle.

According to this aspect, in a case where it is determined that the wheel cannot pass over the recessed portion even if the suspension is retracted, the deceleration of the vehicle is performed. This reduces the impact when the wheel contacts the bottom or edge of the recessed portion.

In the above aspect, preferably, the travel control device further includes a notifier that controls a notification device (69) that makes notification to an occupant of the vehicle, and in a case where the determiner determines that the one of the wheels cannot pass over the recessed portion, the notifier makes the notification.

According to this aspect, the occupant can be prepared for the wheel to collide with the recessed portion.

In the above aspect, preferably, the recessed portion detector detects the recessed portion based on a signal from an optical sensor provided in the vehicle, or detects the recessed portion based on information from a database in which the position and shape of the recessed portion are recorded.

According to this aspect, the travel control device can detect the position and the size of the recessed portion.

Thus, according to the above aspects, it is possible to provide a vehicle control device that can avoid a recessed portion while suppressing a discomfort caused to an occupant.

BRIEF DESCRIPTION OF THE DRAWING(S)

FIGS. 6A and 6B are examples of a map showing a relationship between a vehicle speed, a length of the recessed portion, and a target retraction amount;

DETAILED DESCRIPTION OF THE INVENTION

Hereinafter, with reference to the drawings, an embodiment of a travel control device of a vehicle according to the present invention will be described.

Figure 1:
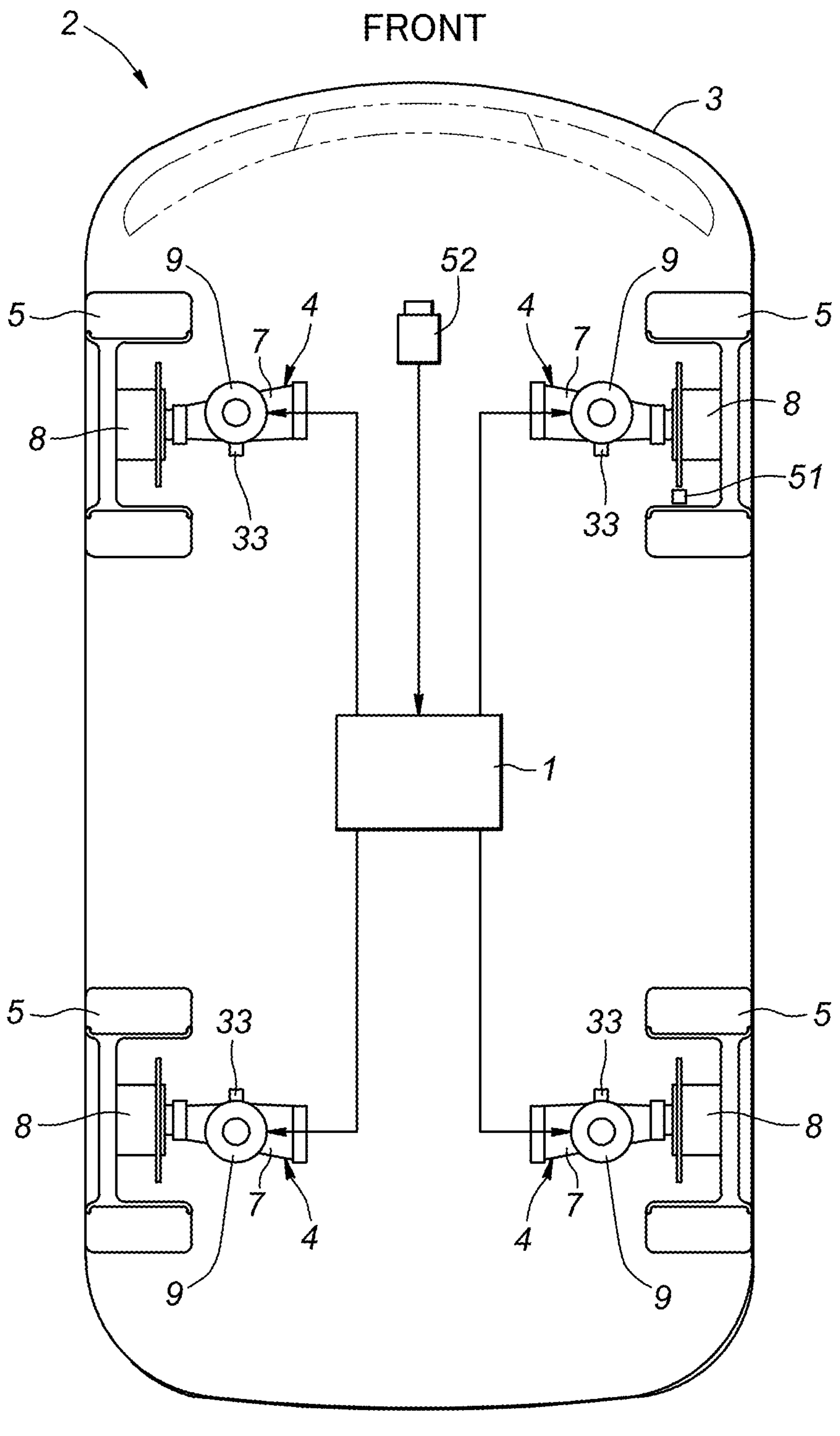
FIG. 1 is an explanatory diagram showing a configuration of a vehicle.

As shown in FIG. 1, a travel control device 1 is provided in a vehicle 2 and controls a traveling of the vehicle 2. The vehicle 2 is a four-wheeled automobile. The vehicle 2 includes a vehicle body 3, a plurality of suspension devices 4 supported by the vehicle body 3, and a plurality of wheels 5 supported by each of the plurality of suspension devices 4. The pairs of the suspension device 4 and the wheel 5 are provided on the front right, front left, rear right, and rear left of the vehicle body 3.

Each suspension device 4 includes a suspension arm 7 rotatably supported by the vehicle body 3, a knuckle 8 provided on the suspension arm 7 and rotatably supporting the wheel 5, and an actuator 9 interposed between the vehicle body 3 and the suspension arm 7. In another embodiment, the actuator 9 may be interposed between the vehicle body 3 and the knuckle 8. Each suspension device 4 is provided between the vehicle body 3 and a plurality of wheels 5, and can change the distance between the vehicle body 3 and the corresponding wheel 5 in the up-and-down direction.

The actuator 9 is controlled to extend and retract by the travel control device 1, and provides a driving force to the vehicle body 3 and the suspension arm 7 to move them relative to each other. The actuator 9 may consist of an electromagnetic damper that expands and contracts when driven by an electric motor, a hydraulic cylinder in which hydraulic pressure is supplied to each chamber of the hydraulic cylinder by an electric pump, or an air spring in which compressed air is supplied to each chamber of an air cylinder by an electric pump. In the present embodiment, the actuator 9 consists of an electromagnetic damper which causes a relative displacement between the vehicle body 3 and the suspension arm 7 by providing a driving force, and can also supply a damping force between the vehicle body 3 and the suspension arm 7 to damp the relative displacement between the vehicle body 3 and the suspension arm 7.

Figure 2:
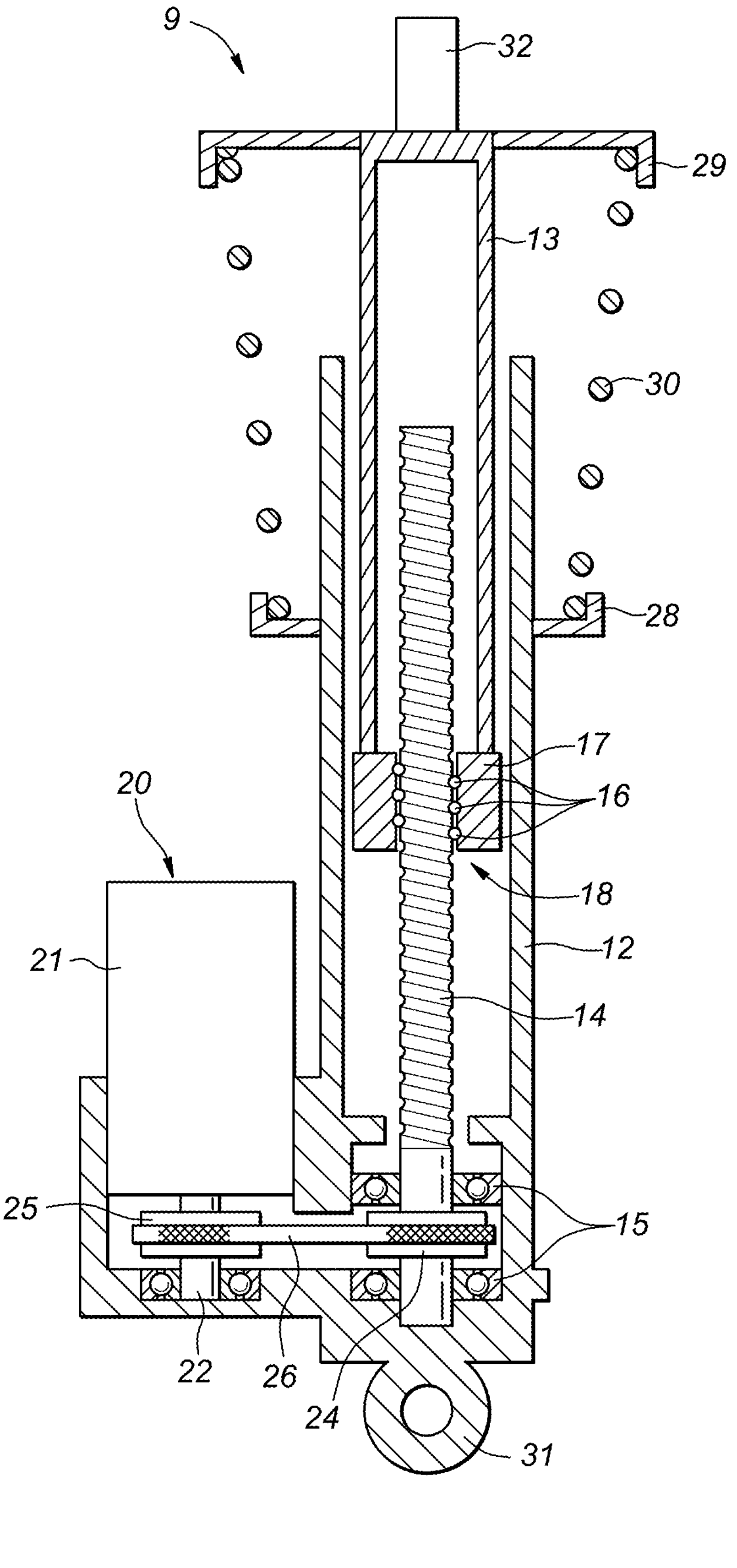
FIG. 2 is a cross-sectional view of a suspension device.

As shown in FIG. 2, the actuator 9 includes a cylindrical outer tube 12 and a cylindrical inner tube 13 having one end inserted into the outer tube 12. The inner tube 13 is arranged coaxially with the outer tube 12 and is displaceable in the axial direction with respect to the outer tube 12. The relative displacement range of the outer tube 12 and the inner tube 13 along the axial direction is restricted within a predetermined range, and the relative rotation around the axial line is prevented. Inside the outer tube 12, a screw rod 14 is arranged coaxially with the outer tube 12. The screw rod 14 is rotatably supported by the outer tube 12 via bearings 15 at an end remote from the inner tube 13. On the outer peripheral surface of the screw rod 14, a spiral screw groove is formed for receiving a plurality of balls 16. A nut 17 which screws onto the screw rod 14 via the balls 16 is coupled to the end of the inner tube 13 inserted into the outer tube 12. The end of the screw rod 14 on the side of the inner tube 13 passes through the nut 17 and extends into the inner tube 13. The screw rod 14, the balls 16, and the nut 17 constitute a ball screw 18.

A housing 21 of an electric motor 20 is attached to an external extension of the outer tube 12 such that an output shaft 22 of the electric motor 20 extends in parallel with the screw rod 14. The electric motor 20 may consist of a per se known motor such as a three-phase brushless motor. The end of the screw rod 14 remote from the inner tube 13 is fitted with a first pulley 24, and the output shaft 22 of the electric motor 20 is fitted with a second pulley 25. An endless belt 26 is wound around the first pulley 24 and the second pulley 25. The outer tube 12 is formed with a slot for passing through the endless belt 26.

An annular (circular) first spring seat 28 protruding radially outward is provided on the outer periphery of the outer tube 12, and an annular (circular) second spring seat 29 protruding radially outward is provided on the outer periphery of the inner tube 13. A compression coil spring 30 is interposed between the first spring seat 28 and the second spring seat 29. The actuator 9 is biased in the extension direction by the compression coil spring 30.

An end of the outer tube 12 remote from the inner tube 13 is fitted with an outer tube attachment member 31, an end of the inner tube 13 remote from the outer tube 12 is fitted with an inner tube attachment member 32. In the present embodiment, the outer tube attachment member 31 is attached to the suspension arm 7, and the inner tube attachment member 32 is attached to the vehicle body 3. In another embodiment, the outer tube attachment member 31 may be attached to the vehicle body 3, and the inner tube attachment member 32 may be attached to the suspension arm 7.

When the outer tube 12 and the inner tube 13 are relatively displaced in the axial direction, the nut 17 is displaced relative to the axial direction of the screw rod 14, causing the screw rod 14 to rotate. The rotation of the screw rod 14 is transmitted to the output shaft 22 of the electric motor 20 via the first pulley 24, the belt 26, and the second pulley 25, causing the electric motor 20 to rotate. Conversely, when the electric motor 20 rotates, the outer tube 12 and the inner tube 13 are relatively displaced in the axial direction. In this manner, the relative displacement in the axial direction of the outer tube 12 and the inner tube 13, i.e., the extension and retraction of the actuator 9, and the rotation of the electric motor 20 are linked together. When the electric motor 20 rotates by the extension and retraction of the actuator 9, an electromotive force is induced so that rotational resistance corresponding to the induced electromotive force is generated, generating a damping force against the extension and retraction of the actuator 9. In addition, when the electric motor 20 is rotated by external electric power, the actuator 9 generates a driving force in the extending direction or the retracting direction, causing the actuator 9 to extend or retract. The driving force and damping force generated by the actuator 9 are controlled by electric power supplied to the electric motor 20. As shown in FIG. 1, the actuator 9 includes the stroke sensor 33 that measures the stroke length (position) of the actuator 9.

Figure 3:
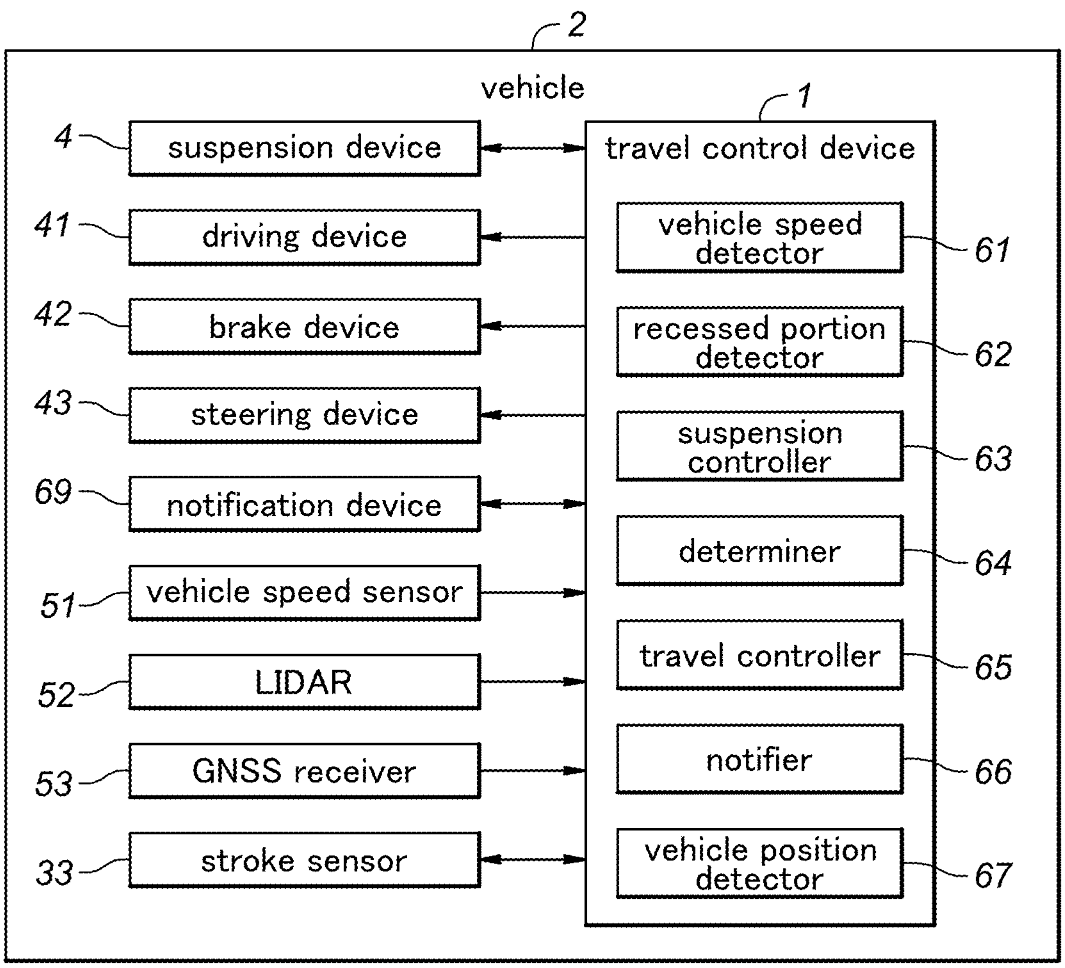
FIG. 3 is a functional block diagram showing a functional configuration of a travel control device.

As shown in FIG. 3, the vehicle 2 includes a driving device 41 that applies driving force to each wheel 5, a brake device 42 that applies braking force to each wheel 5, and a steering device 43 that steers the left and right front wheels 5. The driving device 41 may consist of at least one of an internal combustion engine and an electric motor. The brake device 42 may consist of a disc brake. The steering device 43 preferably consists of a rack and pinion steering device.

The vehicle 2 includes a vehicle speed sensor 51 that detects the vehicle speed and a light detection and ranging (LIDAR) 52. The vehicle speed sensor 51 may consist of a sensor that detects a rotational speed of the wheel 5. The LIDAR 52 is an optical sensor that emits laser light toward the front of the vehicle 2 and detects the shape of the obstacle and a road surface 100 in front of the vehicle 2. The vehicle 2 may include a GNSS receiver 53 for receiving Global Navigation Satellite System (GNSS) signals.

The travel control device 1 includes a computer having a processor such as an microprocessor (MPU) or a CPU, and memory such as ROM and RAM. The travel control device 1 executes various applications by executing operation processing according to a program using a processor. The travel control device 1 may be composed of a single piece of hardware, or may be composed of a unit including a plurality of pieces of hardware. Further, the functions of the travel control device 1 may be at least partially executed by hardware such as an LSI, an ASIC, or an FPGA, or may be executed by a combination of software and hardware. The program is stored in a nonvolatile memory such as a HDD or a flash memory. The travel control device 1 includes a power module for supplying electric power to the electric motor 20 of the actuator 9 and the driving device 41.

The travel control device 1 is connected to the suspension device 4, the driving device 41, the brake device 42, the steering device 43, the vehicle speed sensor 51, the LIDAR 52, and the GNSS receiver 53. The travel control device 1 controls the suspension device 4, the driving device 41, the brake device 42, and the steering device 43.

The travel control device 1 includes, as functional components thereof, a vehicle speed detector 61, a recessed portion detector 62, a suspension controller 63, a determiner 64, a travel controller 65, a notifier 66, and a vehicle position detector 67.

The vehicle speed detector 61 detects the vehicle speed based on a signal from the vehicle speed sensor 51. In another embodiment, the vehicle speed detector 61 may obtain the position of the vehicle 2 at each point, and obtain the vehicle speed based on the position of the vehicle 2 at each point. The position of the vehicle 2 may be detected by the vehicle position detector 67 based on the GNSS signal s received by the GNSS receiver 53.

The recessed portion detector 62 detects the position and the length L of a recessed portion 101 present on the road surface 100 in front of the vehicle 2. The recessed portion 101 includes potholes. A pothole is a circular depression formed in an asphalt pavement.

Figure 4:
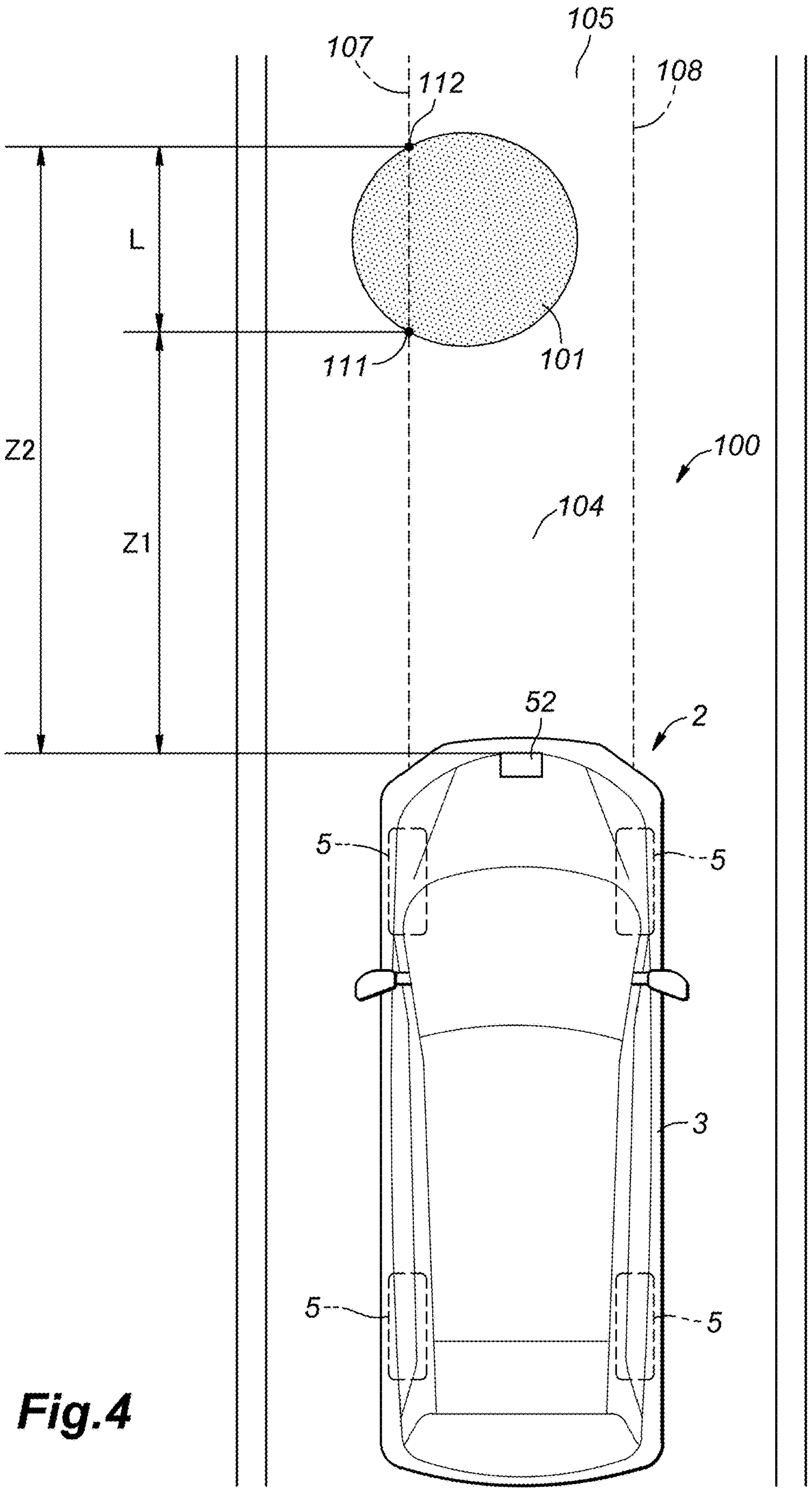
FIG. 4 is an explanatory diagram of the vehicle and a road surface viewed from above.
Figure 5:
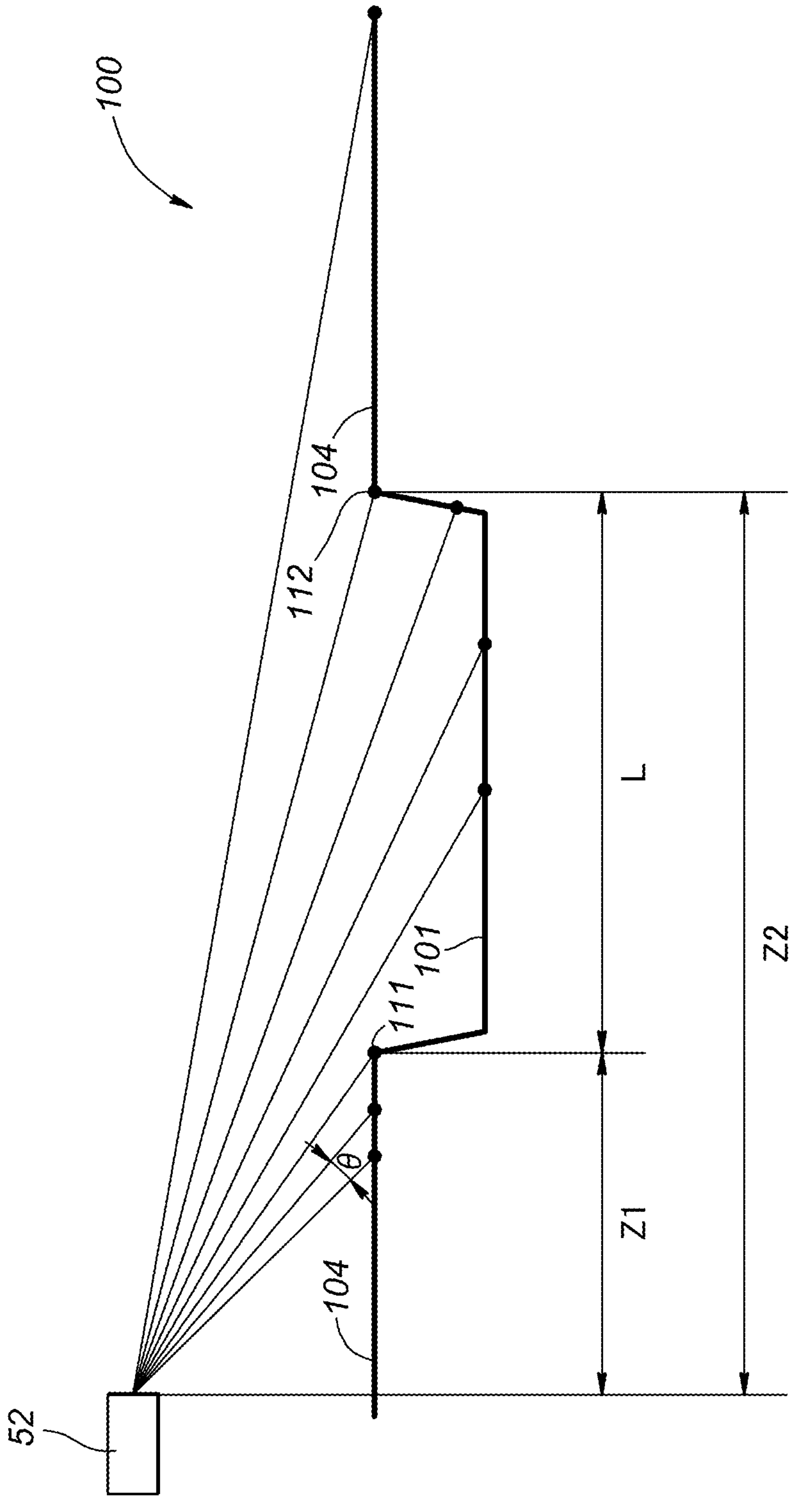
FIG. 5 is an explanatory diagram showing a method for detecting a recessed portion by LIDAR.

As shown in FIGS. 4 and 5, the LIDAR 52 irradiates laser light toward the road surface 100 and, based on the scattered light, detects the surface shape of the road surface 100, i.e., the height of each position on the road surface 100. The LIDAR 52 scans the road surface 100 by irradiating a laser light at each of the predetermined pivoting angles θ. Based on the surface shape of the road surface 100 obtained by the LIDAR 52, the recessed portion detector 62 determines the portion with continuous height to be a reference surface 104, and determines the portion with a lower height than the reference surface to be the recessed portion 101.

The recessed portion detector 62 may detect the position and the length L of the recessed portion 101 based on a signal from the LIDAR 52. Here, the length L of the recessed portion 101 refers to the length L along the extension direction of a lane 105. The width of the recessed portion 101 refers to the length along the width direction of the lane 105. The recessed portion detector 62 may obtain the position of a proximal edge 111, which is the edge of the recessed portion 101 closer to the vehicle 2, and the position of a distal edge 112, which is the edge of the recessed portion 101 farther from the vehicle 2, in the area where the predicted trajectory of the wheel 5 on the left side of the vehicle 2 (a left predicted trajectory 107) or the predicted trajectory of the wheel 5 on the right side of the vehicle 2 (a right predicted trajectory 108) overlaps with the recessed portion 101. In the recessed portion detector 62, the distance between the proximal edge 111 and the distal edge 112 may be set to the length L of the recessed portion 101. The position of the proximal edge 111 may be represented as the distance Z1 along the lane 105 from the position of the LIDAR 52. Additionally, the position of the distal edge 112 may be represented as the distance Z2 along the lane 105 from the position of the LIDAR 52. The recessed portion detector 62 may set the left predicted trajectory 107 and the right predicted trajectory 108 based on the steering angle of the front wheel 5, the vehicle speed, and the current position of the vehicle 2.

The determiner 64 determines whether the wheel 5 can pass over the recessed portion 101 based on the vehicle speed and the length L of the recessed portion 101. The determiner 64 may set the determination value based on the vehicle speed, and determine that the wheel 5 can pass over the recessed portion 101 when the length L of the recessed portion 101 is equal to or less than the determination value. The relationship between the vehicle speed and the determination value may be defined in advance in a map. As the vehicle speed increases, the determination value should increase. As the vehicle speed increases, the time required for the wheel 5 to pass over the recessed portion 101 becomes shorter, and the distance that the vehicle body 3 falls during that time becomes smaller. Accordingly, as the vehicle speed increases, the wheel 5 becomes more likely to pass over the recessed portion 101. The determination value is set based on this concept or strategy.

The suspension controller 63 controls a plurality of suspension devices 4. In a case where the determiner 64 determines that the wheel 5 can pass over the recessed portion 101, the suspension controller 63 retracts the suspension device 4 corresponding to the wheel 5 when the wheel 5 reaches the edge of the recessed portion 101. Accordingly, the wheel 5 that has reached the edge of the recessed portion 101 is pulled up toward the vehicle body 3. Accordingly, even if the portion of the vehicle body 3 corresponding to the wheel 5 moves downward due to gravity, the lower end of the wheel 5 is maintained above the reference surface 104 of the road surface 100. Accordingly, the wheel 5 can pass over the recessed portion 101 without entering the recessed portion 101.

Based on the vehicle speed and the length L of the recessed portion 101, the suspension controller 63 determines the target retraction amount ST of the suspension device 4, i.e., the target retraction amount ST of the actuator 9, and retracts the actuator 9 corresponding to the wheel 5 that has reached the proximal edge 111 of the recessed portion 101 by the target retraction amount ST. It is preferable that the suspension controller 63 increases the target retraction amount ST of the actuator 9 as the vehicle speed decreases. Moreover, it is preferable that the suspension controller 63 increases the target retraction amount ST of the actuator 9 as the length L of the recessed portion 101 increases. The relationship between the vehicle speed, the length L of the recessed portion 101, and the target retraction amount ST of the actuator 9 may be defined in advance in a map. FIGS. 6A and 6B are examples of the map.

The suspension controller 63 calculates a target current value to be supplied to the electric motor 20 according to the target retraction amount ST, and supplies the target current value to the electric motor 20. The relationship between the target retraction amount ST and the target current value may be obtained by an experiment or the like and may be defined in a map in advance. The relationship between the target retraction amount ST and the target current value may be set taking into consideration a state where the wheel 5 is away from the road surface 100.

The travel controller 65 controls the driving device 41 and the brake device 42. When the determiner 64 determines that the wheel 5 cannot pass over the recessed portion 101, the travel controller 65 controls at least one of the driving device 41 and the brake device 42 to decelerate the vehicle 2. The travel controller 65 may reduce the output of the driving device 41 to decelerate the vehicle 2. Furthermore, the travel controller 65 may apply engine brakes when the driving device 41 consists of an internal combustion engine. Furthermore, when the driving device 41 consists of an electric motor, the travel controller 65 may apply regenerative braking. The travel controller 65 may increase the braking force of the brake device 42 to decelerate the vehicle 2.

The notifier 66 makes notification to an occupant of vehicle 2. The notifier 66 may control the notification device 69 connected to the travel control device 1 to make notification to the occupant by image, sound, or vibration. The notification device 69 may consist of a Human Machine Interface (HMI) such as a display, a speaker, or a vibrator.

Figure 7:
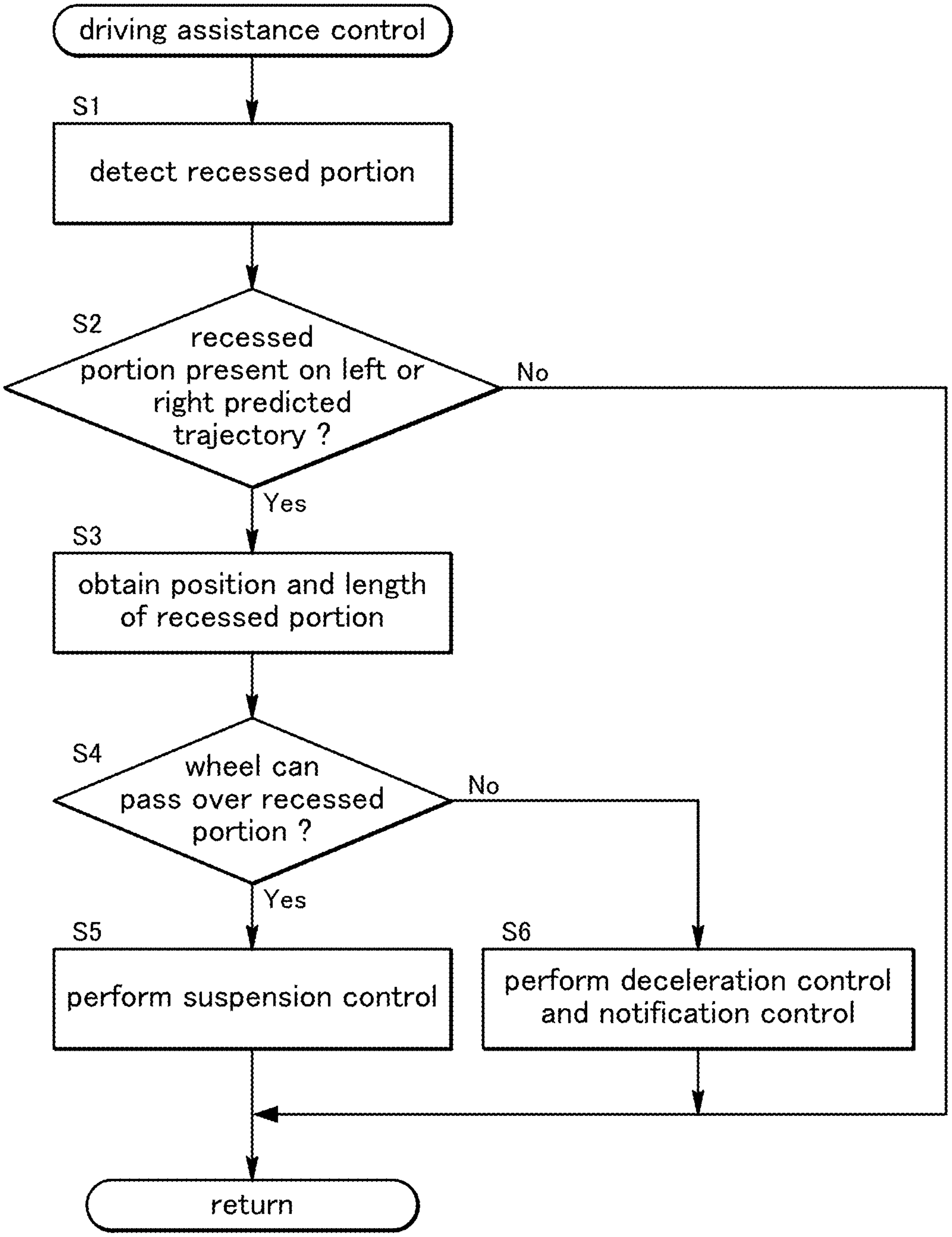
FIG. 7 is a flowchart of a driving assistance control.

The travel control device 1 performs the driving assistance control based on the flowchart in FIG. 7. The travel control device 1 repeatedly performs the driving assistance control at the predetermined time intervals. First, the travel control device 1 detects the recessed portion 101 on the left predicted trajectory 107 or the right predicted trajectory 108 based on the shape of the road surface 100 obtained from the LIDAR 52 (S1). Next, the travel control device 1 determines whether the recessed portion 101 is present on the left predicted trajectory 107 or the right predicted trajectory 108 (S2). In a case where the recessed portion 101 is not present on either the left predicted trajectory 107 or the right predicted trajectory 108 (the determination result in S2 is No), the travel control device 1 repeats the driving assistance control from step S1.

In a case where the recessed portion 101 is present on the left predicted trajectory 107 or the right predicted trajectory 108 (the determination result in S2 is Yes), the travel control device 1 obtains the position of the proximal edge 111, the position of the distal edge 112, and the length L of the recessed portion 101 present on the left predicted trajectory 107 or the right predicted trajectory 108 (S3).

Next, based on the vehicle speed and the length L of the recessed portion 101, the travel control device 1 determines whether the wheel 5 can pass over the recessed portion 101 (S4). The travel controller 65 may set the determination value based on the vehicle speed and compare the length L of the recessed portion 101 with the determination value. The travel controller 65 determines that the wheel 5 can pass over the recessed portion 101 when the length L of the recessed portion 101 is equal to or less than the determination value.

Figure 8:
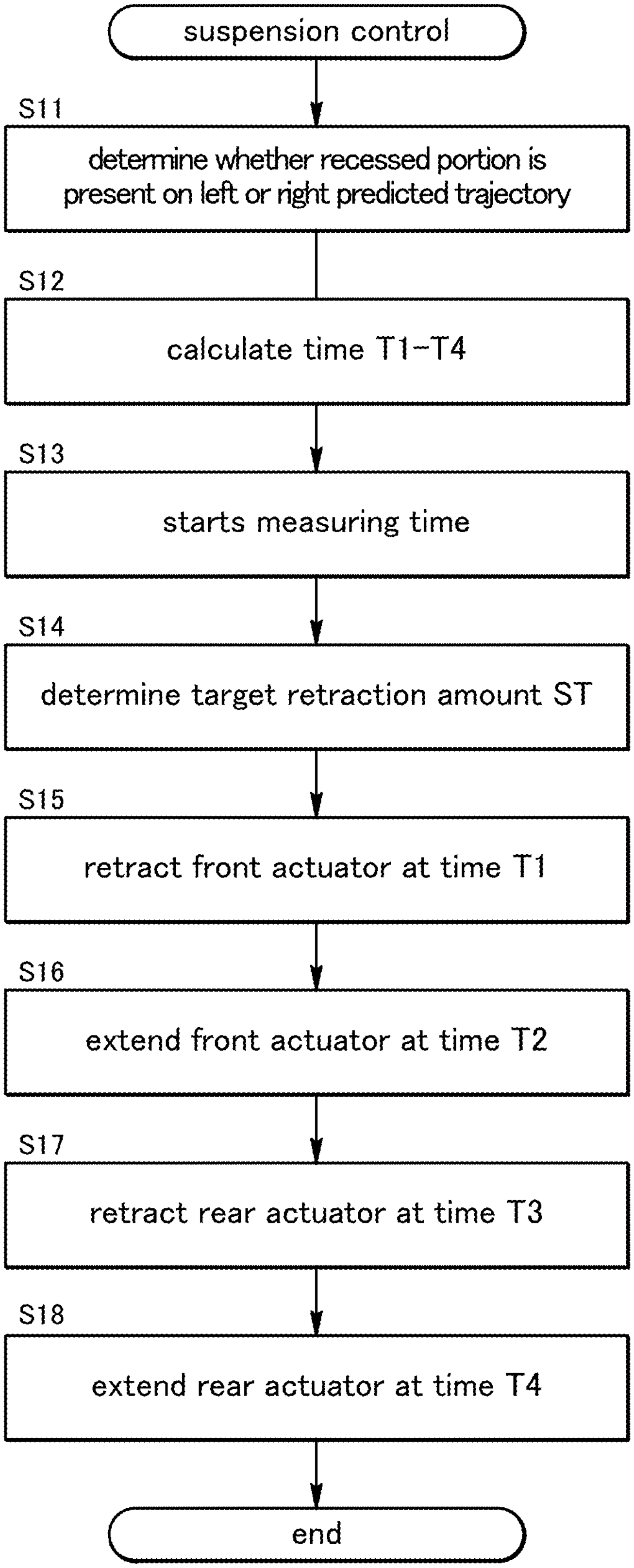
FIG. 8 is a flowchart of a suspension control.

In a case where it is determined that the wheel 5 can pass over the recessed portion 101 (the determination result in S4 is Yes), the travel control device 1 performs the suspension control (S5). The travel control device 1 performs the suspension control based on the flowchart in FIG. 8. In the suspension control, the travel control device 1 first determines whether the recessed portion 101 is present on the left predicted trajectory 107 or the right predicted trajectory 108 (S11). Next, based on the position of the proximal edge 111 of the recessed portion 101 and the vehicle speed, the travel control device 1 calculates the time T1 required for the front wheel 5 corresponding to the recessed portion 101 to reach the proximal edge 111 of the recessed portion 101, the time T2 required for the front wheel 5 to reach the distal edge 112 of the recessed portion 101, the time T3 required for the rear wheel 5 to reach the proximal edge 111 of the recessed portion 101, and the time T4 required for the rear wheel 5 to reach the distal edge 112 of the recessed portion 101 (S12). Here, the position of the wheel 5 is a position directly below the center of rotation thereof, i.e., the center of the wheel 5 in the front-and-rear direction. Then, the travel control device 1 starts measuring time (S13). Time T1 may be shortened by the predetermined margin so that the front wheel 5 does not enter the recessed portion 101. Similarly, time T3 may be shortened by the predetermined margin so that the front wheel 5 does not enter the recessed portion 101. Further, the time T2 may be extended by the predetermined margin so that the front wheel 5 does not enter the recessed portion 101. Similarly, time T4 may be extended by the predetermined margin so that the rear wheel 5 does not enter the recessed portion 101.

Next, the travel control device 1 determines the target retraction amount ST of the actuator 9 of the suspension device 4 based on the length L of the recessed portion 101 and the vehicle speed (S14).

When the measured time reaches time T1, the travel control device 1 retracts the actuator 9 of the suspension device 4 corresponding to the front wheel 5 on the side where the recessed portion 101 is present in the lateral direction (S15). At this time, the travel control device 1 controls the electric motor 20 so that the actuator 9 retracts by the target retraction amount ST. Accordingly, the front wheel 5 on the side where the recessed portion 101 is present in the lateral direction moves toward the vehicle body 3, so that the front wheel 5 is prevented from entering the recessed portion 101. At this time, above the recessed portion 101, the wheel 5 and the vehicle body 3 move forward while maintaining the vehicle speed, and also move downward due to gravity.

Next, when the measured time reaches time T2, the travel control device 1 extends the actuator 9 of the suspension device 4 corresponding to the front wheel 5 on the side where the recessed portion 101 is present in the lateral direction to return it to the initial state (S16). Here, the initial state refers to the state before the actuator 9 is retracted in step S15. Accordingly, in step S16, the travel control device 1 extends the actuator 9 by the target retraction amount ST. By the processing of step S16, the front wheel 5 that has passed over the recessed portion 101 contacts the reference surface 104 of the road surface 100, and the height of the portion of the vehicle body 3 corresponding to the wheel 5 returns to the original state. It is preferable that the extension speed of the actuator 9 in step S16 is sufficiently slower than the retraction speed of the actuator 9 in step S15. This can reduce the discomfort caused to the occupant due to the extension of the actuator 9.

Next, when the measured time reaches time T3, the travel control device 1 retracts the actuator 9 of the suspension device 4 corresponding to the rear wheel 5 on the side where the recessed portion 101 is present in the lateral direction (S17). At this time, the travel control device 1 controls the electric motor 20 so that the actuator 9 retracts by the target retraction amount ST. Accordingly, the rear wheel 5 on the side where the recessed portion 101 is present in the lateral direction moves toward the vehicle body 3, so that the rear wheel 5 is prevented from entering the recessed portion 101. At this time, above the recessed portion 101, the wheel 5 and the vehicle body 3 move forward while maintaining the vehicle speed, and also move downward due to gravity.

Next, when the measured time reaches time T4, the travel control device 1 extends the actuator 9 of the suspension device 4 corresponding to the rear wheel 5 on the side where the recessed portion 101 is present in the lateral direction to return it to the initial state (S18). Here, the initial state refers to the state before the actuator 9 is retracted in step S17. Accordingly, in step S18, the travel control device 1 extends the actuator 9 by the target retraction amount ST. By the processing of step S18, the rear wheel 5 after passing over the recessed portion 101 contacts the reference surface 104 of the road surface 100, and the height of the portion of the vehicle body 3 corresponding to the wheel 5 returns to the original state. It is preferable that the extension speed of the actuator 9 in step S18 is sufficiently slower than the retraction speed of the actuator 9 in step S17. This can reduce the discomfort caused to the occupant due to the extension of the actuator 9.

After performing the processing of step S18, the travel control device 1 ends the suspension control.

In a case where it is determined that the wheel 5 cannot pass over the recessed portion 101 (the determination result in S4 is No), the travel control device 1 performs the deceleration control and the notification control (S6). In the deceleration control, the travel control device 1 controls at least one of the driving device 41 and the brake device 42 to reduce the vehicle speed. Furthermore, in the notification control, the travel control device 1 controls the notification device 69 to make notification to the occupant that the vehicle 2 is passing over the recessed portion 101.

Figure 9:
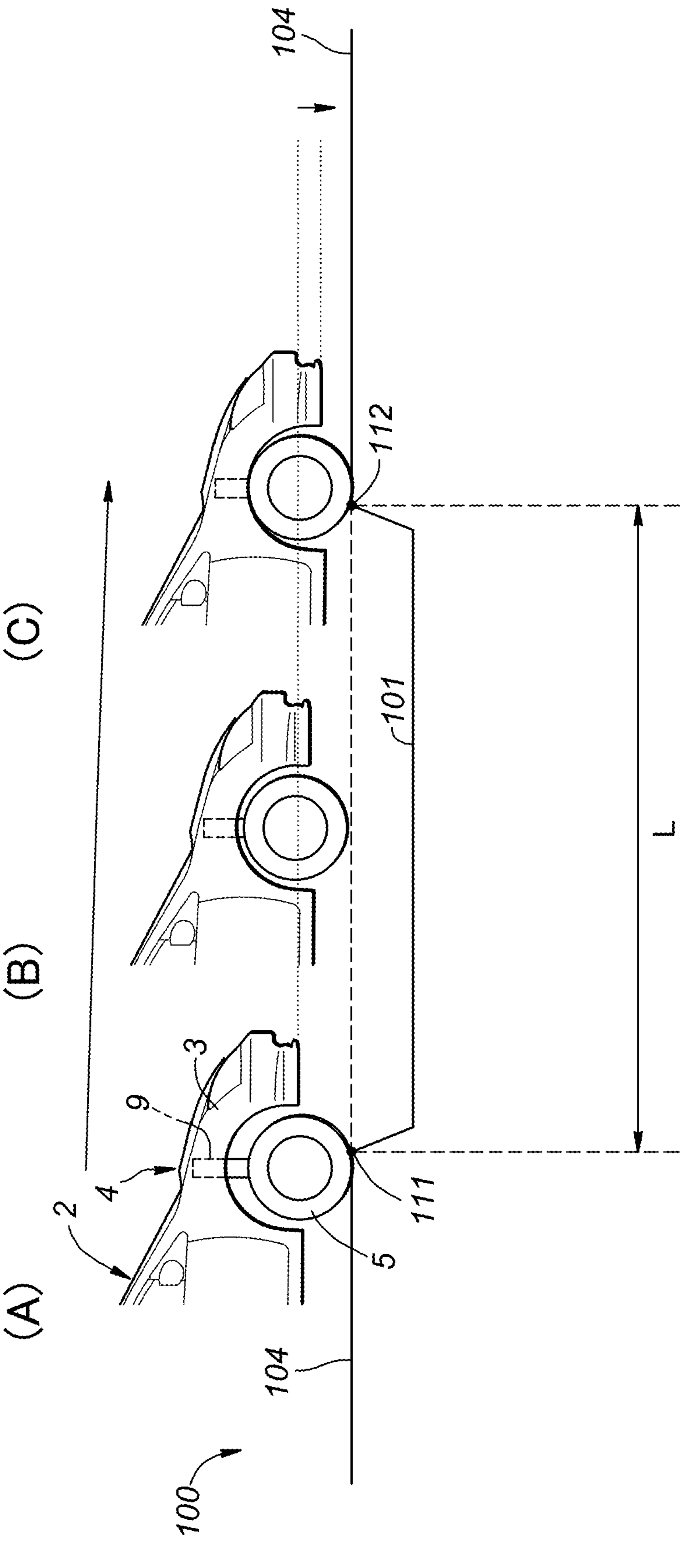
FIG. 9 is an explanatory diagram showing a behavior of the vehicle under the suspension control.

According to the above embodiment, as shown in FIG. 9, when the wheel 5 reaches the distal edge 112 of the recessed portion 101, the wheel 5 is pulled up towards the vehicle body 3, i.e., upward. This allows the wheel 5 to pass over the recessed portion 101 without entering the recessed portion 101. Accordingly, the vehicle 2 can move straight without being affected by the recessed portion 101. In this manner, it is possible to provide the travel control device 1 that can avoid the recessed portion 101 while suppressing the discomfort caused to the occupant. Since no steering is required to move left or right around the recessed portion 101, the travel control device 1 can suppress the discomfort caused to the occupant. In FIG. 9, for convenience of explanation, the length L of the recessed portion 101 is illustrated longer than the normal length.

Since the retraction amount of the suspension device 4, i.e., the retraction amount of the actuator 9, is determined based on the vehicle speed and the length L of the recessed portion 101, the wheel 5 can reliably pass over the recessed portion 101. As the retraction amount of the suspension device 4 increases, the upward movement amount of the wheel 5 increases. This allows the time until the wheel 5 and the vehicle body 3 move downward, and the wheel 5 contacts the road surface 100 to be extended. Further, even when the vehicle speed is low, the wheel 5 can reliably pass over the recessed portion 101. Further, by preventing the wheel 5 from moving upward from the reference surface 104 of the road surface 100, the impact when the wheel 5 contacts the road surface 100 after passing over the recessed portion 101 can be reduced.

In a case where it is determined that the wheel 5 cannot pass over the recessed portion 101 even if the suspension device 4 is retracted, the deceleration of the vehicle 2 is performed. This reduces the impact when the wheel 5 contacts the bottom or edge of the recessed portion 101. Further, when it is determined that the wheel 5 cannot pass over the recessed portion 101 even if the suspension is retracted, the notification is made to the occupant, so that the occupant can be prepared for the wheel 5 to collide with the recessed portion 101.

Concrete embodiments of the present invention have been described in the foregoing, but the present invention should not be limited by the foregoing embodiments and various modifications and alterations are possible within the scope of the present invention. For example, the recessed portion detector 62 may detect the recessed portion 101 based on information from a database in which the position and the shape of the recessed portion 101 are recorded. The database may be included in the travel control device 1 or may be provided outside the vehicle 2. Further, the recessed portion detector 62 may detect the recessed portion 101 based on an image captured by an onboard camera that captures an image of the area in front of the vehicle.

In the above embodiment, the actuator 9 corresponding to the wheel 5 is configured to start retracting when the wheel 5 reaches the proximal edge 111 of the recessed portion 101. However, in another embodiment, the actuator 9 corresponding to the wheel 5 may start retracting after the wheel 5 reaches the proximal edge 111 of the recessed portion 101 and before the wheel 5 reaches the distal edge 112. That is, as long as the lower end of the wheel 5 is positioned above the reference surface 104 when the wheel 5 reaches the distal edge 112 of the recessed portion 101, the timing at which the actuator 9 starts retracting may be changed arbitrarily.

In another embodiment, the determination value may be set to a fixed value regardless of the vehicle speed. Additionally, the target retraction amount ST may be set to a fixed value regardless of the vehicle speed and the length L of the recessed portion 101.

In a case where the recessed portion 101 is present on each of the left predicted trajectory 107 and the right predicted trajectory 108, and the left and right front wheels 5 reach the recessed portion 101 at the same time, the travel control device 1 may determine in step S4 that the wheel 5 cannot pass over the recessed portion 101. Further, so as to retract the actuator 9 corresponding to a certain wheel 5, the condition that all the actuators 9 corresponding to all other wheels 5 are not in a retracted state may be set.

In another embodiment, in a case where it is determined in step S4 that the wheel 5 cannot pass over the recessed portion 101 (the determination result in S4 is No), the travel control device 1 may control the steering device 43 to move the vehicle 2 left and right. This allows the wheel 5 to avoid the recessed portion 101 left and right.

The invention claimed is:

1. A travel control device for a vehicle, comprising:
   - a vehicle speed detector configured to detect a vehicle speed of the vehicle;
   - a recessed portion detector configured to detect a position and a length of a recessed portion present on a road surface in front of the vehicle;
   - a suspension controller configured to control a plurality of suspension devices that is provided between a vehicle body and a plurality of wheels and can change a distance between the vehicle body and one of the wheels in an up-and-down direction; and
   - a determiner configured to determine whether the one of the wheels can pass over the recessed portion based on the vehicle speed and the length of the recessed portion, wherein in a case where the determiner determines that the one of the wheels can pass over the recessed portion, the suspension controller retracts one of the suspension devices corresponding to the one of the wheels when the one of the wheels reaches an edge of the recessed portion, and the suspension controller is configured to determine a retraction amount of the one of the suspension devices based on the vehicle speed and the length of the recessed portion, and increase the retraction amount of the one of the suspension devices as the length of the recessed portion increases.

2. The travel control device according to claim 1, wherein the suspension controller is configured to increase the retraction amount of the one of the suspension devices as the vehicle speed decreases.

3. The travel control device according to claim 1, further comprising a travel controller configured to control a driving device and a brake device of the vehicle, wherein in a case where the determiner determines that the one of the wheels cannot pass over the recessed portion, the travel controller controls at least one of the driving device and the brake device to decelerate the vehicle.

4. The travel control device according to claim 1, further comprising a notifier configured to control a notification device that makes notification to an occupant of the vehicle, wherein in a case where the determiner determines that the one of the wheels cannot pass over the recessed portion, the notifier makes the notification.

5. The travel control device according to claim 1, wherein the recessed portion detector is configured to detect the recessed portion based on a signal from an optical sensor provided in the vehicle, or detect the recessed portion based on information from a database in which the position and shape of the recessed portion are recorded.

* * * * *